(12) United States Patent
Zhao et al.

(10) Patent No.: US 11,379,449 B2
(45) Date of Patent: Jul. 5, 2022

(54) METHOD, ELECTRONIC DEVICE AND COMPUTER PROGRAM PRODUCT FOR CREATING METADATA INDEX

(71) Applicant: EMC IP Holding Company LLC, Hopkinton, MA (US)

(72) Inventors: Jingrong Zhao, Chengdu (CN); Qingxiao Zheng, Chengdu (CN); Yi Wang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 215 days.

(21) Appl. No.: 16/510,826

(22) Filed: Jul. 12, 2019

(65) Prior Publication Data
US 2020/0327109 A1 Oct. 15, 2020

(30) Foreign Application Priority Data
Apr. 12, 2019 (CN) .......................... 201910293914.4

(51) Int. Cl.
*G06F 16/22* (2019.01)
(52) U.S. Cl.
CPC .............................. *G06F 16/2255* (2019.01)
(58) Field of Classification Search
None
See application file for complete search history.

(56) References Cited

U.S. PATENT DOCUMENTS

| | | | |
|---|---|---|---|
| 9,104,675 B1 * | 8/2015 | Clark | G06F 16/10 |
| 10,311,021 B1 * | 6/2019 | Pillai | G06F 16/137 |
| 2006/0218176 A1 * | 9/2006 | Sun Hsu | G06F 16/2272 |
| 2016/0134696 A1 * | 5/2016 | Datuashvili | G06F 16/178 707/626 |
| 2017/0242911 A1 * | 8/2017 | Agarwal | G06F 16/24578 |
| 2018/0196887 A1 * | 7/2018 | Ueda | G06F 16/9014 |

FOREIGN PATENT DOCUMENTS

WO  WO-2012048037 A2 * 4/2012 ........... G06F 9/5077

OTHER PUBLICATIONS

Ramez Elmasri and Shamkant Navathe, "Fundamentals of Database System, Chapter 14: Indexing Structures for Files", 2004, accessible from <http://crystal.uta.edu/~elmasri/db1/notes/ENCh14.ppt> (Year: 2004).*

* cited by examiner

*Primary Examiner* — Polina G Peach
*Assistant Examiner* — Anugeetha Kunjithapatham
(74) *Attorney, Agent, or Firm* — Womble Bond Dickinson (US) LLP

(57) ABSTRACT

Embodiments of the present disclosure relate to a method, an electronic device and a computer program product for creating metadata index. The method disclosed herein comprises: generating a first-level index to index a metadata item; inserting a first indication into the first-level index to indicate a position of the metadata item in a set of metadata; generating a second-level index to index a set of first-level indexes; and inserting a second indication into the second-level index to indicate a set of positions of the set of metadata. In this way, embodiments of the present disclosure can create an index structure which can indicate the position of the metadata item, so as to rapidly determine the position of the metadata item.

15 Claims, 6 Drawing Sheets

METHOD, ELECTRONIC DEVICE AND COMPUTER PROGRAM PRODUCT FOR CREATING METADATA INDEX

CROSS-REFERENCE TO RELATED APPLICATION

This patent application claims priority, under 35 U.S.C. § 119, of Chinese Patent Application No. 201910293914.4, filed Apr. 12, 2019, entitled "METHOD, ELECTRONIC DEVICE AND COMPUTER PROGRAM PRODUCT FOR CREATING METADATA INDEX," which is incorporated by reference herein its entirety.

FIELD

Embodiments of the present disclosure generally relate to the storage field, and more specifically, to a method, an electronic device and a computer program product for creating metadata index.

BACKGROUND

In a multi-node system including a plurality of electronic devices, it is vital to keep metadata consistent between electronic devices. Otherwise, the system will go into an unpredictable state and cause errors. Some systems provide backup for the metadata of the entire system by having metadata in other electronic devices backed up in each electronic device. The system can compare and check the metadata in each electronic device during maintenance and handle the inconsistent metadata discovered during the check. However, since the system usually includes a large amount of electronic devices and the metadata in each electronic device are also huge, a large amount of time and resources would be consumed for comparing the metadata between each electronic device.

SUMMARY

Embodiments of the present disclosure provide a method, an electronic device and a computer program product for creating metadata index.

In a first aspect of the present disclosure, there is provided a method for creating a metadata index. The method comprises: generating a first-level index to index a metadata item; inserting a first indication into the first-level index to indicate a position of the metadata item in a set of metadata; generating a second-level index to index a set of first-level indexes; and inserting a second indication into the second-level index to indicate a set of positions of the set of metadata.

In a second aspect of the present disclosure, there is provided a method for indexing metadata. The method comprises: determining a second-level index associated with a target metadata item, the second-level index being used to index a set of first-level indexes, and the set of first-level indexes being used to index a first set of metadata; obtaining a second indication contained in the second-level index, the second indication indicating a set of positions of the first set of metadata; determining a first-level index in the set of first-level indexes that indexes the target metadata item; obtaining a first indication contained in the first-level index, the first indication indicating a position of the target metadata item in the first set of metadata; and determining a position of the target metadata item based on the first and second indications.

In a third aspect of the present disclosure, there is provided an electronic device. The electronic device comprises: a processor; and a memory storing computer program instructions, the processor executing the computer program instructions in the memory to control the electronic device to perform actions comprising: generating a first-level index to index a metadata item; inserting a first indication into the first-level index to indicate a position of the metadata item in a set of metadata; generating a second-level index to index a set of first-level indexes; and inserting a second indication into the second-level index to indicate a set of positions of the set of metadata.

In a fourth aspect of the present disclosure, there is provided an electronic device. The electronic device comprises: a processor; and a memory storing computer program instructions, the processor executing the computer program instructions in the memory to control the electronic device to perform actions comprising: determining a second-level index associated with a target metadata item, the second-level index being used to index a set of first-level indexes, and the set of first-level indexes being used to index a first set of metadata; obtaining a second indication contained in the second-level index, the second indication indicating a set of positions of the first set of metadata; determining a first-level index in the set of first-level indexes that indexes the target metadata item; obtaining a first indication contained in the first-level index, the first indication indicating a position of the target metadata item in the first set of metadata; and determining a position of the target metadata item based on the first and second indications.

In a fifth aspect of the present disclosure, there is provided a computer program product being tangibly stored on a non-transitory computer-readable medium and comprising computer-executable instructions, the computer-executable instructions, when executed, causing a computer to perform actions comprising: generating a first-level index to index a metadata item; inserting a first indication into the first-level index to indicate a position of the metadata item in a set of metadata; generating a second-level index to index a set of first-level indexes; and inserting a second indication into the second-level index to indicate a set of positions of the set of metadata.

In a sixth aspect of the present disclosure, there is provided a computer program product being tangibly stored on a non-transitory computer-readable medium and comprising computer-executable instructions, the computer-executable instructions, when executed, causing a computer to perform actions comprising: determining a second-level index associated with a target metadata item, the second-level index being used to index a set of first-level indexes, and the set of first-level indexes being used to index a first set of metadata; obtaining a second indication contained in the second-level index, the second indication indicating a set of positions of the first set of metadata; determining a first-level index in the set of first-level indexes that indexes the target metadata item; obtaining a first indication contained in the first-level index, the first indication indicating a position of the target metadata item in the first set of metadata; and determining a position of the target metadata item based on the first and second indications.

It should be appreciated that the Summary is not intended to identify key or essential features of the embodiments of the present disclosure, or limit the scope of the present disclosure. Other features of the present disclosure will be understood more easily through the following description.

BRIEF DESCRIPTION OF THE DRAWINGS

Through following detailed description with reference to accompanying drawings, the above and other objectives, features, and advantages of the present disclosure will become more apparent. In the drawings, multiple embodiments of the present disclosure are explained in an exemplary and non-restrictive manner, where.

DETAILED DESCRIPTION OF EMBODIMENTS

Figure 1:
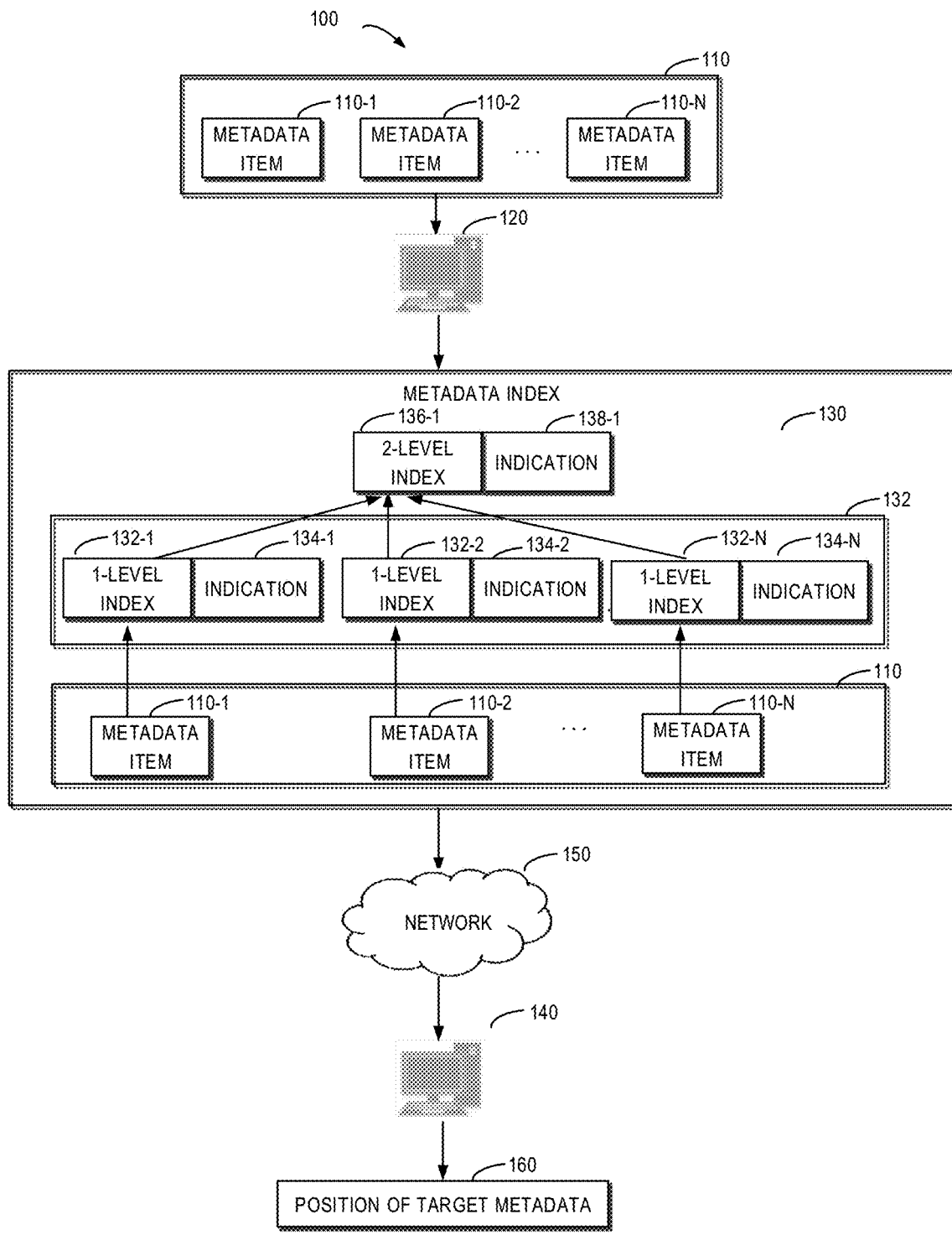
FIG. 1 illustrates a schematic diagram of an example environment 100 for creating a metadata index 130 and for indexing metadata in accordance with embodiments of the present disclosure.

Principles of the present disclosure are now explained with reference to various example embodiments shown in the drawings. It should be appreciated that those embodiments are described merely to enable those skilled in the art to better understand and further implement the present disclosure without suggesting any limitation to the scope disclosed herein in any manner. It should be noted that similar or same reference signs can be used in the drawings where feasible, and similar or same reference signs can represent similar or same elements. Those skilled in the art will easily recognize from the following description that alternative embodiments of the structure and method described in the text can be adopted without deviating from the principles and concepts of the present invention described herein.

In the context of the present disclosure, the term "includes" and its variants are to be read as open-ended terms that mean "includes, but is not limited to." The term "based on" is to be read as "based at least in part on." The term "one embodiment" is to be read as "at least one embodiment." The term "a further embodiment" is to be read as "at least a further embodiment." Other terms, which may occur but are not mentioned here, should not be interpreted or defined in a way that contradicts the concepts on which the embodiments of the present disclosure are based unless indicated otherwise.

As described above, in a multi-node system including a plurality of electronic devices, it is vital to keep metadata consistent between electronic devices. Otherwise, the system will go into an unpredictable state and cause errors. Some systems provide backup for the metadata of the entire system by having metadata in other electronic devices backed up in each electronic device. The system can compare and check the metadata in each electronic device during maintenance and determine a specific position of the inconsistent metadata item. Then, the system can separately handle the inconsistent metadata items discovered during the check. However, the system usually includes a large amount of electronic devices and the metadata in each electronic device are also huge. If each metadata item in every electronic device is compared with each metadata item in other electronic devices one by one to determine the specific position of the inconsistent metadata item, a large amount of time and resources will be consumed.

To address the above problems and/or other potential problems, embodiments of the present disclosure propose a solution for creating a metadata index. This solution can generate a first-level index to index a metadata item and can insert a first indication into the first-level index to indicate a position of the metadata item in a set of metadata. The solution can generate a second-level index to index a set of first-level indexes and can insert a second indication into the second-level index to indicate a set of positions of the set of metadata. In this way, the solution can create an index structure for indicating the positions of the metadata items, so as to rapidly determine the position of the metadata item.

Basic principles and implementations of the present disclosure will be explained below with reference to the drawings. It should be understood that the example embodiments are provided here to merely enable those skilled in the art to better understand and further implement embodiments of the present disclosure, rather than limiting the scope of the present disclosure in any manner.

FIG. 1 illustrates a schematic diagram of an example environment 100 for creating a metadata index 130 and for indexing metadata in accordance with embodiments of the present disclosure. As shown in FIG. 1, the environment 100 includes electronic devices 120 and 140, which can implement transmission of various data via a network 150. The network 150 can be a wired network, a wireless network or a combination thereof. For example, the network 150 can include, but not limited to, Internet, Wide Area Network, Metropolitan Area Network, Local Area Network, Virtual Private Network, Wireless Communications Network and the like.

Electronic devices 120 and 140 can be computers, servers or any other devices available for creating the metadata index 130 or for indexing the metadata. Although two electronic devices are illustrated in FIG. 1, it should be appreciated that this is only for the purpose of examples, without suggesting any limitation to the scope of the present disclosure. In some embodiments, different number of other devices and/or other devices with different functions may also be included.

As shown in FIG. 1, the electronic device 120 can handle a set of metadata 110 to create the metadata index 130. The set of metadata 110 includes one or more metadata items 110-1, 110-2, . . . , 110-N, where N is a positive integer greater than 1. Each metadata item can include a segment of metadata. The electronic device 120 can handle each metadata item to generate the first-level indexes 132-1, 132-2, . . . , 132-N to index the metadata items 110-1, 110-2, . . . , 110-N. The electronic device 120 can insert indications 134-1, 134-2, . . . , 134-N respectively into the first-level indexes 132-1, 132-2, . . . , 132-N, the indications 134-1, 134-2, . . . , 134-N indicating positions of the metadata items 110-1, 110-2, . . . , 110-N in the set of metadata 110 respectively.

The electronic device 120 can handle the set of first-level indexes 132 containing indications 134-1, 134-2, . . . , 134-N to generate a second-level index 136 for indexing the set of first-level indexes 132. The electronic device 120 can insert the indication 138-1 into the second-level index 136-1 and the indication 138-1 can indicate a set of positions of the set of metadata 110.

As shown in FIG. 1, the electronic device 120 creates the metadata index 130 by inserting respective indications into the generated first-level indexes 132-1, 132-2, . . . , 132-N and the second-level index 136-1. Although FIG. 1 only illustrates one set of metadata 110, one set of first-level indexes 132 and one second-level index 136-1, it should be understood that this is only for the purpose of examples and is not intended for restricting the scope of the present disclosure. In some embodiments, the metadata index 130 can include a plurality of sets of metadata, a plurality of sets of first-level indexes and a plurality of second-level indexes, all of which are interrelated with one another.

Although the metadata index 130 shown in FIG. 1 only contains two levels of index, it should be appreciated that this is only for the purpose of examples and is not intended for restricting the scope of the present disclosure. For example, when there is a plurality of second-level indexes, the plurality of second-level indexes can be processed to generate one or more three-level indexes. When a plurality of three-level indexes is included, the plurality of three-level indexes also can be processed to generate one or more four-level indexes and so on. The present application has no restrictions over levels of the index.

After creating the metadata index 130, the electronic device 120 can send, via the network 150, the metadata index 130 to the electronic device 140, which can index the metadata using the metadata index 130, so as to obtain a position 160 of the target metadata item. The position 160 of the target metadata item can be an address of the target metadata item and also can be a serial number associated with the address of the target metadata item etc. Although FIG. 1 illustrates that the electronic device 120 is used for creating the metadata index 130 and the electronic device 140 is used for indexing the metadata, it should be understood that this is only for the purpose of examples and is not intended for restricting the scope of the present disclosure. In some embodiments, both the electronic devices 120 and 140 can be employed for creating the metadata index 130 and for indexing the metadata.

The electronic devices 120 and 140 can also include a processor and a memory. In some embodiments, the memory can be stored with computer programs and instructions of these programs can be executed by the processor to control operations of the electronic device. It should be appreciated that the electronic devices 120 and 140 also can include some other modules and/or devices not shown in FIG. 1, such as a communication module, input/output devices and the like.

Figure 2:
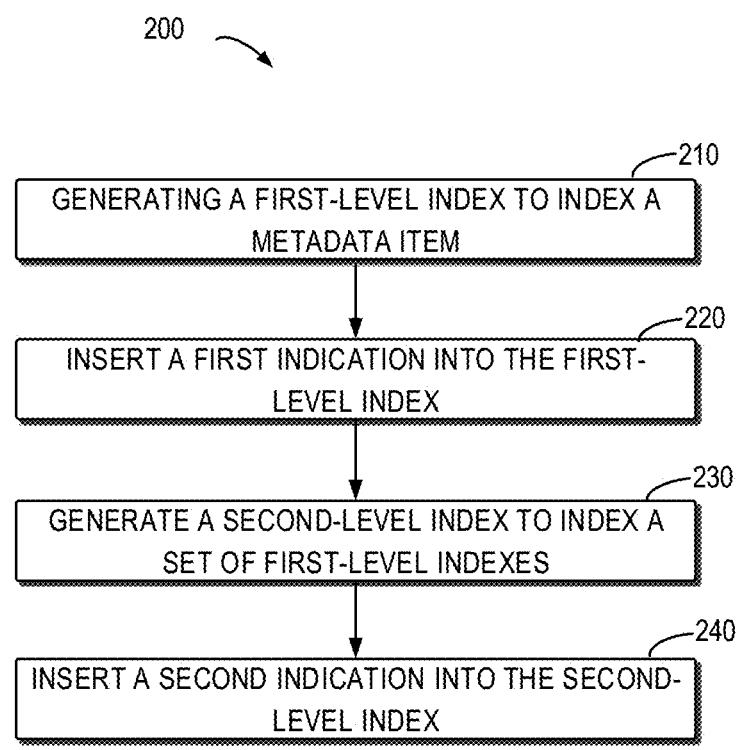
FIG. 2 illustrates a flowchart of a method 200 of creating the metadata index 130 in accordance with embodiments of the present disclosure.

FIG. 2 illustrates a flowchart of a method 200 of creating the metadata index 130 in accordance with embodiments of the present disclosure. It should be understood that at least a part of the method 200 can be performed by the electronic device 120 described above with reference to FIG. 1. The method 200 can also include blocks not shown and/or omit the shown blocks. The scope of the present disclosure is not restricted in this regard.

At block 210, the electronic device 120 generates a first-level index 132-1 to index the metadata item 110-1. In some embodiments, the electronic device 120 can perform a hash algorithm on the metadata item 110-1 to generate a character string associated with the metadata item 110-1, wherein the generated character string can act as the first-level index to index the metadata item 110-1. The hash algorithm (e.g., SHA-1, SHA-2 and the like) can convert any data into a character string. Different data can be converted into different character strings and the identical data can be converted into the same character string. In some embodiments, the hash algorithm can be performed on each metadata item in the set of metadata 110 to generate a set of first-level indexes 132 including one or more first-level indexes 132-1, 132-2, . . . , 132-N. It should be understood that other suitable algorithms also can be performed on each metadata item to obtain corresponding first-level indexes, such as Message Digest Algorithm MD4, MD5 and the like. The scope of the present disclosure is not restricted in this regard. In this way, the complicated metadata items can be converted into character strings.

At block 220, the electronic device 120 inserts an indication 134-1 into the first-level index 132-1, the indication 134-1 indicates a position of the metadata item 110-1 in the set of metadata 110. The electronic device 120 can insert each first-level index 132-1 with an indication indicating a position of corresponding metadata items in the set of metadata respectively. For example, if the metadata item 110-1 is a first metadata item in the set of metadata 110, the indication 134-1 can indicate a first position in the set of metadata 110. In this way, information associated with the position of the metadata item can be inserted into the first-level index.

At block 230, the electronic device 120 generates the second-level index 136-1 to index the set of first-level indexes 132. In some embodiments, the electronic device 120 can perform the hash algorithm on the set of first-level indexes 132 to generate character strings associated with the set of first-level indexes 132. As each first-level index in the set of first-level indexes 132 has been respectively inserted indications 134-1, 134-2, . . . , 134-N for indicating positions of respective metadata items in the set of metadata, the generated character strings can be used as second-level index associated with indications 134-1, 134-2, . . . , 134-N inserted into the set of first-level index. The generated character strings can be used as second-level index associated with the set of first-level indexes 132. The set of first-level indexes 132 can include one or more first-level indexes 132-1, 132-2, . . . , 132-N. In some embodiments, if there is a plurality of sets of first-level indexes, the hash algorithm can be performed on each set of first-level indexes to obtain a plurality of second-level indexes. Accordingly, the complicated set of first-level indexes 132 can be converted into a fixed-length character string.

At block 240, the electronic device 120 inserts an indication 138-1 into the second-level index 136-1, the indication 138-1 indicates a set of positions of the set of metadata 110. In some embodiments, the set of positions of the set of metadata 110 can include addresses of one or more metadata items or one or more serial numbers associated with the addresses of one or more metadata items. Therefore, the electronic device 120 can insert the position information associated with the set of metadata 110 into the second-level index 136-1 to create the metadata index 130 which can indicate the positions of the metadata items.

Figure 3:
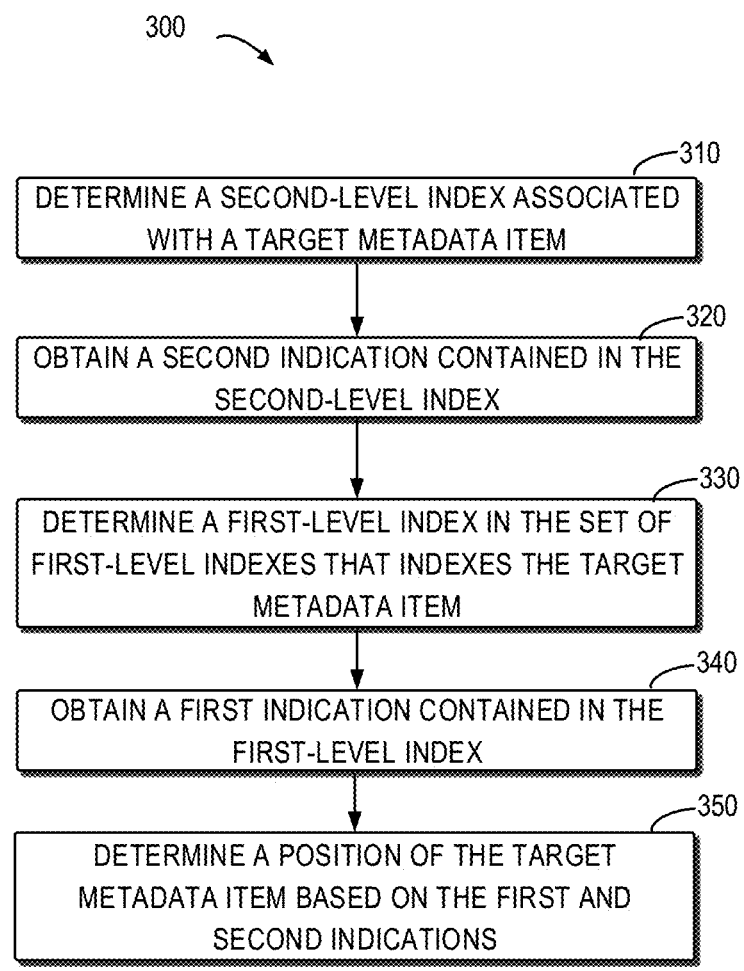
FIG. 3 illustrates a flowchart of a method 300 of indexing the metadata in accordance with embodiments of the present disclosure.

FIG. 3 illustrates a flowchart of a method 300 of indexing the metadata in accordance with embodiments of the present disclosure. It should be understood that at least a part of the method 300 can be performed by the electronic device 140 described above with reference to FIG. 1. The method 300 can also include blocks not shown and/or can omit the shown blocks. The scope of the present disclosure is not restricted in this regard.

At block 310, the electronic device 140 determines a second-level index 136-1 associated with the target metadata item 110-2. In some embodiments, the set of metadata 110 can be compared with other sets of metadata, then the metadata item 110-2 in the set of metadata 110 mismatching with other sets of metadata acts as the target metadata. In some embodiments, the electronic device 140 can compare the second-level index 136-1 in the metadata index 130 with the second-level indexes in other metadata indexes. If the second-level index 136-1 mismatches with the second-level indexes in other metadata indexes, the second-level index 136-1 is determined as the second-level index associated with the target metadata item 110-2. In this way, the electronic device 140 can determine the second-level index 136-1 associated with the target metadata item 110-2 to facilitate subsequent acquisition of the position of the target metadata item 110-2.

As described above, the first-level index is a character string generated by performing the hash algorithm on the metadata item, while the second-level index 136-1 is a character string generated by performing the hash algorithm on the set of first-level indexes 132. The hash algorithm can generate the same character strings for the identical data and different character strings for different data, therefore, if two metadata items differ from each other, two first-level indexes respectively associated with the two metadata items are also different. Similarly, if the two first-level indexes are different from each other, the second-level indexes associated with the two first-level indexes are also different from each other. Thus, it can be determined whether mismatching metadata items exist in different sets of metadata by comparing indexes with the same level in different sets of metadata. In this way, it is unnecessary for the electronic device 140 to compare all metadata items and the inconsistent metadata items can be determined only by comparing the associated indexes, which greatly enhances the working efficiency of the electronic device 140.

At block 320, the electronic device 140 can obtain the indication 138-1 included in the second-level index 136-1, the indication 138-1 indicates a set of positions of the set of metadata 110. In some embodiments, the set of positions of the set of metadata 110 can include addresses of one or more metadata items or one or more serial numbers associated with the addresses of the one or more metadata items. In this way, a set of positions associated with the target metadata item 110-2 can be determined.

At block 330, the electronic device 140 determines a first-level index 132-2 in the set of first-level indexes 132 for indexing the target metadata item 110-2. In some embodiments, the electronic device 140 can compare the set of first-level indexes 132 in the metadata index 130 with the sets of first-level indexes in other metadata indexes. If the set of first-level indexes 132 mismatches with the sets of first-level indexes in other metadata indexes, the first-level index 132-2 in the set of first-level indexes 132 mismatching with other first-level indexes is determined as the first-level index associated with the target metadata item 110-2. In this way, the electronic device 140 can determine the first-level index 132-2 associated with the target metadata item 110-2, to facilitate subsequent acquisition of the position of the target metadata item 110-2.

At block 340, the electronic device 140 obtains an indication 134-2 included in the first-level index 132-2, the indication 134-2 is used for indicating a position of the target metadata item 110-2 in the set of metadata 110. For example, if the metadata item 110-2 is a second metadata item in the set of metadata 110, the indication 134-2 can indicate a second position in the set of metadata 110. In this way, the electronic device 140 can obtain the information associated with the position of the target metadata item 110-2.

At block 350, the electronic device 140 can determine the position of the target metadata item 110-2 based on the indication 138-1 for indicating a set of positions of the set of metadata 110 and the indication 134-2 indicating the position of the target metadata item 110-2 in the set of metadata 110. In some embodiments, the position of the target set of metadata 110-2 can include an address of the target metadata item 110-2 or a serial number associated with the address of the target metadata item 110-2. For example, if the indication 138-1 indicates a set of addresses associated with the set of metadata 110 or a set of serial numbers associated with the set of metadata 110 and the indication 134-2 indicates a second position 02 in the set of metadata 110, the second address or serial number in the set of addresses or serial numbers serves as the address or the serial number of the target metadata item 110-2. In this way, the specific positions of the inconsistent metadata items in each electronic device can be rapidly determined during the data check of the multi-node system, which facilitates the system to perform a predetermined operation on the metadata item to maintain metadata consistency in each electronic device.

Although the method 200 and the method 300 are respectively performed by different electronic devices in the above description, it should be understood that the method 200 and the method 300 also can be performed by the same electronic device. The scope of the present disclosure is not restricted in this regard.

Figure 4:
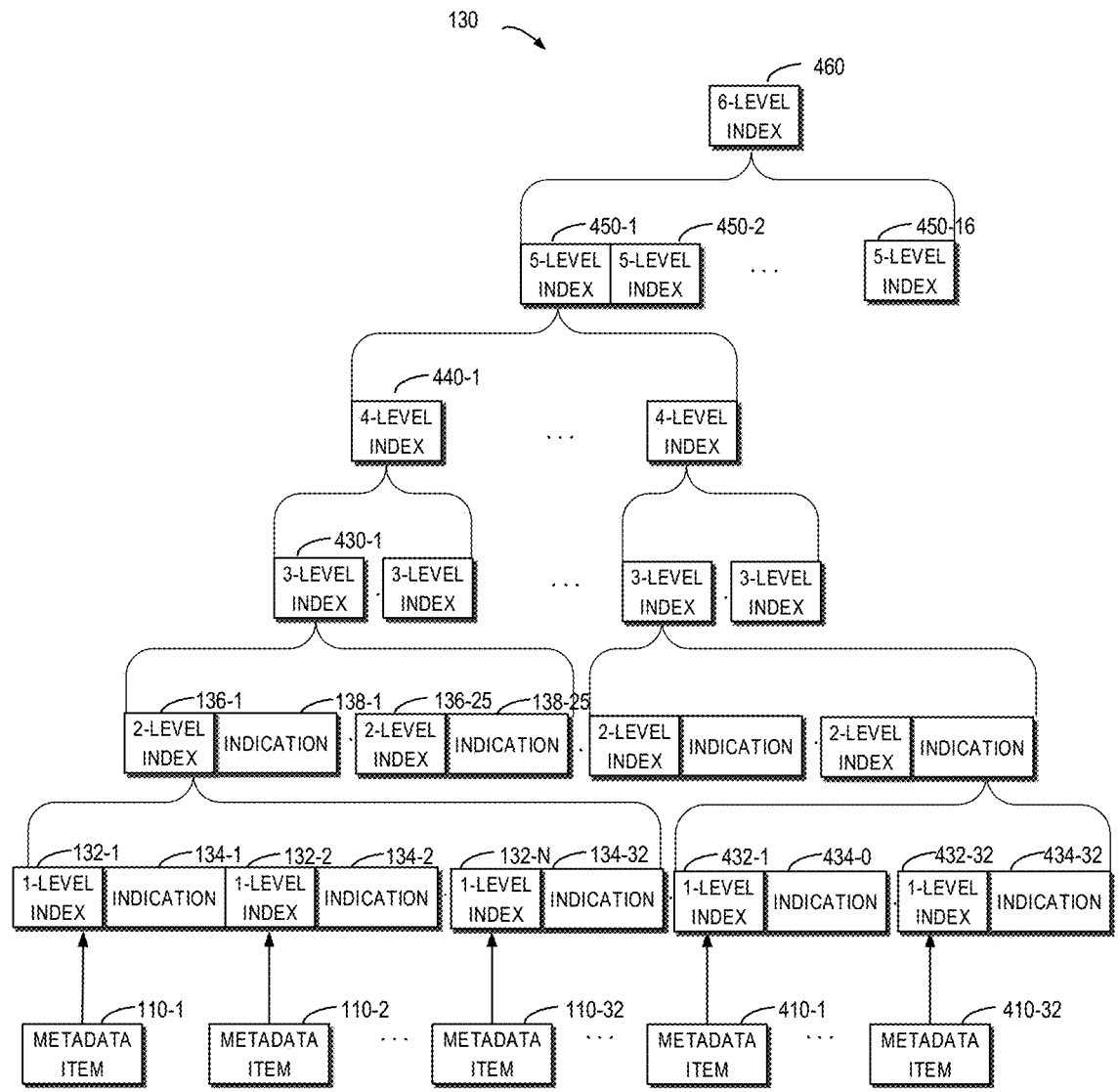
FIG. 4 illustrates a schematic block diagram for creating the metadata index 130 in accordance with embodiments of the present disclosure.

FIG. 4 illustrates a schematic block diagram for creating the metadata index 130 in accordance with embodiments of the present disclosure. Table 1 shows a bitmap of serial numbers associated with the addresses of the metadata items. Detailed embodiments of creating the metadata index 130 will be described below with reference to FIG. 4 and Table 1.

TABLE 1

Bitmap of Serial Number of Metadata Item

| Line Num | Col. Num | | | | | | | |
|---|---|---|---|---|---|---|---|---|
| | #0 | #1 | #2 | #3 | #4 | #5 | ... | #31 |
| #0 | 1 | 1 | 1 | 0 | 1 | 0 | ... | 1 |
| #1 | 1 | 0 | 0 | 1 | 1 | 0 | ... | 0 |
| #2 | 0 | 1 | 1 | 0 | 0 | 1 | ... | 0 |
| #3 | 1 | 0 | 1 | 1 | 0 | 1 | ... | 1 |
| #4 | 1 | 1 | 0 | 1 | 0 | 0 | ... | 1 |
| #5 | 1 | 1 | 1 | 1 | 1 | 0 | ... | 1 |
| ... | ... | ... | ... | ... | ... | ... | ... | ... |

Each item in Table 1 represents a position of one metadata item, value 1 denotes that the position is stored with metadata while value 0 means that the position is not stored with metadata yet. Each column number (such as 0, 1, 2, 3, 4, 5 ... 31) shows the serial number of each metadata item in the set of metadata and the serial number can correspond to the position of the metadata item in the set of metadata. For example, serial number #0 denotes that the corresponding metadata item is located at the first position in the set of metadata and serial number #1 indicates that the corresponding metadata item is located at the second position in the set of metadata and so on. Each line number (such as 0, 1, 2, 3, 4, 5 ...) in Table 1 represents a serial number of one set of metadata as a whole and the serial number can correspond to one set of positions. Therefore, the position of one metadata item can be determined based on one line number and one column number.

The bitmap shown by Table 1 records positions of all metadata items of the electronic device 120. Taking the multi-node system including 16 electronic devices as an example, if the electronic device 120 is one of the electronic devices in the multi-node system, the electronic device 120 is stored with both the metadata required for the operation of the electronic device 120 per se and the metadata of each of the other 15 electronic devices, so as to provide metadata backup for other electronic devices. In order to determine the position of each metadata item of the 16 electronic devices stored in the electronic device 120, 32 storage positions in lines with line number being 0, 16, 32, 64 . . . are defined as the metadata storage position of the first one in the 16 electronic devices, 32 storage positions in lines with line number being 1, 17, 33, 65 . . . are defined as the metadata storage position of the second one in the 16 electronic devices, 32 storage positions in lines with line number being 2, 18, 34, 66 . . . are defined as the metadata storage position of the third electronic device and so on. In this way, positions of all metadata stored in the electronic device 120 can correspond to the bitmap shown in Table 1.

For example, if the line number in Table 1 is set to be X, the column number is set to be Y and the total number of electronic devices in the multi-node system is set to be Z, the serial number of the electronic device can be obtained by X mod Z (the remainder when X dividing Z). The serial number of the metadata item in the electronic device corresponding to X line and Y column can be further obtained via X/Z*32+Y, wherein X/Z is rounded down. For example, in case there are 16 electronic devices, in order to determine the position of one metadata with line number being 7 and column number being 8 in the bitmap, it can be determined, via 7 mode 16=7, that the metadata belongs to an electronic device (with serial number 8) stored in the electronic device 120, then the metadata item can be determined as the ninth metadata in the electronic device (with serial number 8) through 7/16*32+8=8. In this way, the position corresponding to the metadata item (with line number X and column number Y) can be determined through the bitmap shown in Table 1.

Although the bitmap shown in Table 1 includes 32 columns, it should be appreciated that the bitmap can include any suitable number of columns, e.g., 16 columns, 64 columns and the like. The scope of the present disclosure is not restricted in this regard.

FIG. 4 illustrates a schematic block diagram for creating the metadata index 130 in accordance with embodiments of the present disclosure. The electronic device 120 first performs the hash algorithm on each stored metadata item 110-1, 110-2, . . . , 110-32, . . . , 410-1, . . . , 410-32 to respectively generate the first-level indexes 132-1, 132-2, . . . , 132-32, . . . 432-1, . . . , 432-32 for indexing the corresponding metadata items, wherein each first-level index is a character string for indexing a corresponding metadata item. In this example, the order of the metadata item in FIG. 4 corresponds to the order in Table 1. For example, the metadata items of the electronic device corresponding to the serial number 0 in Table 1 are sorted according to the sequence in Table 1 and then the metadata items of the electronic device corresponding to the serial number 1 in Table 1 are sorted, and the metadata items of the electronic device corresponding to the serial number 2 in Table 1 are sorted subsequently and so on. In this way, all metadata items in the electronic device 120 can be sorted according to a predetermined sequence and the generated first-level indexes should also be sorted according to the predetermined sequence.

As shown in FIG. 4, the electronic device 120 can insert indications 134-1, 134-2, . . . , 134-32, . . . , 434-1, . . . , 434-32 for indicating column numbers in Table 1 respectively into each of the first-level indexes 132-1, 132-2, . . . , 132-32, . . . , 432-1, , 432-32, wherein the column numbers corresponds to the serial numbers of the respective metadata items in Table 1. Then, the electronic device 120 can perform the hash algorithm respectively on each set of first-level indexes including corresponding set of indications to generate one or more second-level indexes. Each first-level index set can include 32 first-level indexes and each second-level index is a character string for indexing the corresponding set of first-level indexes. Accordingly, 32 first-level indexes corresponding to 32 metadata items in each line and the corresponding indications are jointly converted into one second-level index. Similar to the first-level index, the electronic device 120 can respectively insert the indication for indicating the line number in Table 1 into each second-level index, the line number is the one of 32 metadata items associated with the second-level index in the table. In this way, the information associated with the position of each metadata item can be inserted into the metadata index 130 to facilitate determining the position of the target metadata item during metadata indexing.

Similar to the set of first-level indexes, the electronic device 120 can perform the hash algorithm respectively on each set of second-level indexes containing the set of corresponding indications to generate a plurality of three-level indexes. Each set of second-level indexes can include for example 25 second-level indexes and each three-level index is a character string for indexing the corresponding set of second-level indexes. It can be observed that the number of the three-level indexes has already been much smaller than the total number of the metadata items. Then, the electronic device 120 can continue to perform the hash algorithm respectively on each set of three-level indexes to generate a plurality of four-level indexes and each set of three-level indexes can include for example 25 three-level indexes, and each four-level index is a character string for indexing the corresponding set of three-level indexes. The electronic device 120 can continue to perform the hash algorithm respectively on each set of four-level indexes to generate a plurality of five-level indexes and each set of four-level indexes can include for example 5 four-level indexes, and each five-level index is a character string for indexing the corresponding set of four-level indexes. It should be understood that the set of second-level indexes, the set of three-level indexes and the set of four-level indexes each can respectively include any suitable number of second-level, three-level and four-level indexes and the scope of the present disclosure is not restricted in this regard. In this way, the electronic device 120 can compress the number of indexes level by level to boost the indexing efficiency during the metadata indexing.

In the example shown by FIG. 4, the number of five-level indexes can be compressed to 16, wherein the five-level index 450-1 is associated with all metadata items of the first electronic device (with serial number 0) stored in the electronic device 120 and the five-level index 450-2 is associated with all metadata items of the second electronic device (with serial number 1) stored in the electronic device 120. By analogy, the five-level index 450-16 is associated with all metadata items of the sixteenth electronic device (with serial number 15) stored in the electronic device 120. Finally, the electronic device 120 can perform the hash algorithm once again on the set of five-level indexes containing the 16 five-level indexes to obtain a six-level index 460, which is a character string for indexing the set of five-level indexes. In this way, the electronic device 120 creates the index structure which can index all metadata items, such that the electronic device 120 can rapidly determine inconsistent metadata items when the metadata items are compared between multiple electronic devices.

Although the metadata index 130 includes six levels of indexes in the example of FIG. 4, it should be understood that since the number of electronic devices in need of mutual backup of the metadata items in the multi-node system varies and the number of metadata items in every electronic device also differs, the metadata index 130 can include any suitable levels of index and each level of index can include any appropriate number of indexes. The scope of the present disclosure is not restricted in this regard.

Figure 5:
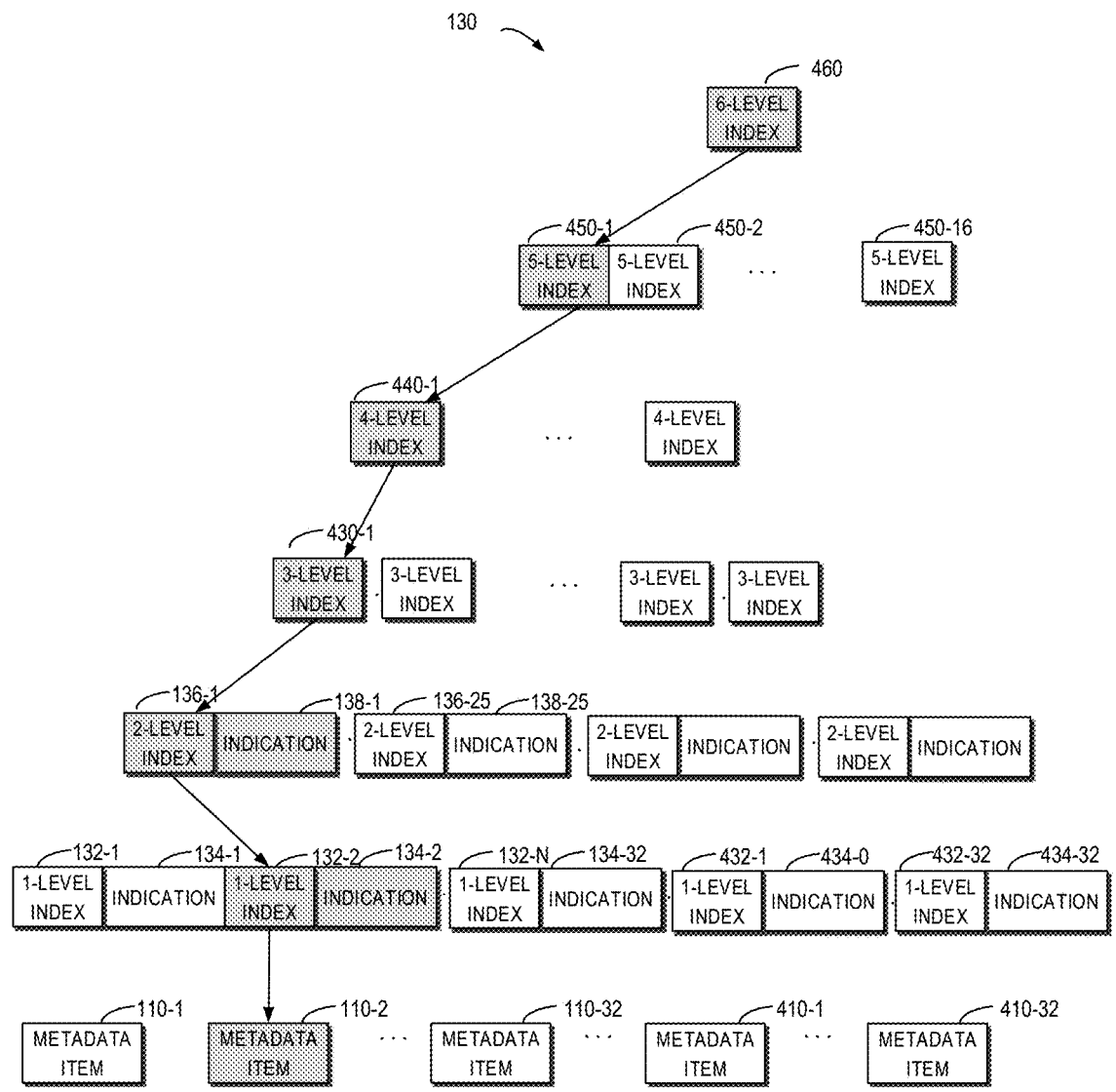
FIG. 5 illustrates a schematic block diagram for indexing the metadata in accordance with embodiments of the present disclosure.

FIG. 5 illustrates a schematic block diagram of indexing the metadata in accordance with embodiments of the present disclosure. When it is required that the multi-node system checks the metadata between the electronic devices, any electronic device can act as the initiator of the check. Here the electronic device 140, for example, sends a check request to other electronic devices. If other electronic devices are currently performing other task and unavailable for metadata check, the request of the electronic device 140 will be denied. If all of the other electronic devices agree the check request of the electronic device 140, each electronic device (including initiator) will respectively create the metadata index shown in FIG. 4. Once the creation is completed, other electronic devices send their respectively created metadata indexes to the electronic device 140. It should be appreciated that each electronic device can send the created metadata indexes to the electronic device 140 in a one-off manner and also can send the indexes level by level to the electronic device 140. In this way, the electronic device 140 can complete the metadata check of the entire system only by comparing the metadata index in each electronic device, which greatly reduces the amount of data exchange within the system.

After receiving the metadata index sent from other electronic devices, the electronic device 140 can first compare the six-level index (i.e., index of the highest level) in each metadata index. Since the hash algorithm can convert different data into different character strings and the identical data into the same character strings, if the six-level indexes in each electronic device are identical to one another, it means that all metadata items in each electronic device are completely consistent. If a six-level index in a certain electronic device differs from the six-level indexes of other electronic devices, it means that the electronic device contains metadata items inconsistent with other electronic devices. In this way, the electronic device 140 can rapidly determine one or more electronic devices containing inconsistent metadata items in the multi-node system.

As shown in FIG. 5, if the electronic device 140 determines that the six-level index 460 of the electronic device 120 differs from the six-level indexes of other electronic devices, the set of five-level indexes associated with the six-level index 460 is then compared with the set of five-level indexes of other electronic device to determine which five-level index in the set of five-level indexes is inconsistent. If it is determined that the five-level index 450-1 is inconsistent, the set of four-level indexes associated with the five-level index 450-1 is then compared with the corresponding set of four-level indexes in other electronic device to determine which four-level index in the set of four-level indexes is inconsistent. If it is determined that the four-level index 440-1 is inconsistent, the set of three-level indexes associated with the four-level index 440-1 is then compared with the corresponding set of three-level indexes in other electronic device. By analogy, the target metadata item 110-2 can be finally determined to be inconsistent in a level-by-level indexing approach. In this way, the electronic device 140 can determine the inconsistent metadata items without comparing all metadata items in each electronic device.

As the target metadata item 110-2 itself does not include its storage position, the target metadata item 110-2 cannot be finally located only by finding the target metadata item 110-2 through the metadata index 130. According to FIG. 5, the electronic device 140 can determine the second-level index 136-1 and the first-level index 132-2 associated with the target metadata item 110-2 and then obtain the indication 138-1 contained in the second-level index 136-1 and the indication 134-2 contained in the first-level index 132-2. The indication 138-1 and the indication 132-2 respectively denote row 0 and line 1 in the bitmap shown by Table 1, so the target metadata item 110-2 can be determined as the second metadata item in the electronic device (with serial number 0). In this way, the electronic device 140 can determine the position of the target metadata 110-2 based on the serial number of the target metadata item 110-2, so as to perform the subsequent operations on the metadata, thereby maintaining the consistency between the metadata items in respective electronic devices.

Although the example of FIG. 5 only demonstrates one inconsistent metadata item 110-2, it should be understood that each electronic device can have any number of inconsistent metadata items and the position of each inconsistent metadata item can be determined via a method similar to the one shown in FIG. 5. The present disclosure will provide no more details here.

Figure 6:
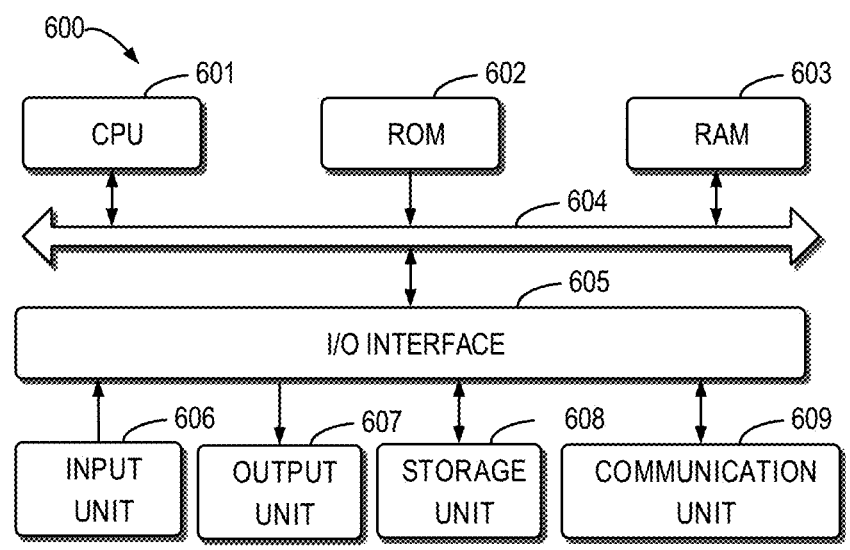
FIG. 6 illustrates a schematic block diagram of an example device 600 for implementing embodiments of the present disclosure.

FIG. 6 illustrates a schematic block diagram of an example device 600 for implementing embodiments of the present disclosure. The device can be the electronic device 120 and 140 as described above with reference to FIG. 1. As shown, the device 600 includes a central process unit (CPU) 601, which can execute various suitable actions and processing based on the computer program instructions stored in the read-only memory (ROM) 602 or computer program instructions loaded in the random-access memory (RAM) 603 from a storage unit 608. The RAM 603 can also store all kinds of programs and data required by the operations of the device 600. CPU 601, ROM 602 and RAM 603 are connected to each other via a bus 604. The input/output (I/O) interface 605 is also connected to the bus 604.

A plurality of components in the device 600 is connected to the I/O interface 605, including: an input unit 606, such as keyboard, mouse and the like; an output unit 607, e.g., various kinds of display and loudspeakers etc.; a storage unit 608, such as disk and optical disk etc.; and a communication unit 609, such as network card, modem, wireless transceiver and the like. The communication unit 609 allows the device 600 to exchange information/data with other devices via the computer network, such as Internet, and/or various telecommunication networks.

Various methods and processes described above may be performed by the processing unit 601. For example, in some embodiments, the method can be implemented as a computer software program tangibly included in the machine-readable medium, e.g., storage unit 608. In some embodiments, the computer program can be partially or fully loaded and/or mounted to the device 600 via ROM 602 and/or communication unit 609. When the computer program is loaded to RAM 603 and executed by the CPU 601, one or more steps or actions of the above described method or procedure can be implemented.

In some embodiments, the above described method and procedure can be implemented as computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, and traditional procedural programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments of the present disclosure. Many modifications and alterations, without deviating from the scope and spirit of the explained various embodiments, are obvious for those skilled in the art. The selection of terms in the text aims to best explain principles and actual applications of each embodiment and technical improvements made in the market by each embodiment, or enable other ordinary skilled in the art to understand embodiments of the present disclosure.

We claim:

1. A method for creating a metadata index for metadata of a multi-node system in which operation of the multi-node system depends on a consistency of the metadata across the multi-node system, comprising:
   identifying all locations of copies of a metadata item within the multi-node system, one of the locations being on a first electronic device of the multi-node system and a second of the locations being on a second electronic device of the multi-node system;
   generating a first-level index for each of the copies of the metadata index;

inserting an indication into each first-level index to indicate a position of a corresponding copy of the metadata item, the position usable to identify the locations of the corresponding copy of the metadata item;

generating a first second-level index for the metadata index to index a first set of the first-level index, the first set of the first-level index all being associated with copies of the metadata item having locations of the first electronic device;

inserting a second indication into the first second-level index that directly specifies a first set of positions associated with the copies of the metadata item having the locations of the first electronic device;

generating a second second-level index for the metadata index to index a second set of first-level index, the second set of first-level index all being associated with copies of the metadata item having locations of the second electronic device;

inserting a third indication into the second second-level index that directly specifies a second set of positions associated with the copies of the metadata item having the locations of the second electronic device;

identifying an inconsistency between the metadata index and a remote metadata index from the second electronic device, the inconsistency being based on the second second-level index of the metadata index being different from a corresponding second second-level index of the remote metadata index, wherein the metadata index and the remote metadata index are generated using a same process; and updating the metadata index based on the identified inconsistency to obtain an updated metadata index that is consistent with the remote metadata index.

2. The method of claim 1, wherein generating the first-level index comprises:
performing a hash algorithm on one of the copies of the metadata item, to generate a first character string associated with the one of the copies of the metadata item as the first-level index.

3. The method of claim 1, wherein generating the first second-level index comprises:
performing a hash algorithm on the first set of the first-level indexes, to generate a second character string associated with the first set of the first-level indexes as the first second-level index.

4. A method for indexing metadata for metadata of a multi-node computing system in which operation of the multi-node computing system depends on a consistency of the metadata across the multi-node computing system, comprising:
obtaining, by an electronic device of the multi-node computing system, a metadata index to provide metadata inconsistency identification;
obtaining, by the electronic device, a remote metadata index from a second electronic device of the multi-node computing system, the metadata index and the remote metadata index indexing a same set of metadata distributed across the multi-node computing system, the set of metadata being redundantly stored across the multi-node computing system;
identifying, by the electronic device, a second-level index of the metadata index and a corresponding second-level index of the remote metadata index;
identifying, by the electronic device, an inconsistency between the metadata index and the remote metadata index, the inconsistency being based on the second-level index being different from the corresponding second-level index;
obtaining a second indication contained in the second-level index, the second indication indicating a position of a metadata item that is redundantly stored in the electronic device for the second electronic device, the metadata item being inconsistent with a corresponding metadata item stored in the second electronic device; and
accessing the metadata item based on the position.

5. The method of claim 4, wherein the second-level index is a second character string associated with a set of first-level indexes that is generated by performing a hash algorithm on the set of first-level indexes.

6. An electronic device of a multi-node system in which operation of the multi-node system depends on a consistency of metadata across the multi-node system, comprising:
a processor; and
a memory storing computer program instructions, the processor executing the computer program instructions in the memory to control the electronic device to perform operations for creating a metadata index for metadata of a multi-node system in which operation of the multi-node system depends on a consistency of the metadata across the multi-node system, the operations comprising:
identifying all locations of copies of a metadata item within the multi-node system, one of the locations being on a first electronic device of the multi-node system and a second of the locations being on a second electronic device of the multi-node system;
generating a first-level index for each of the copies of the metadata index;
inserting an indication into each first-level index to indicate a position of a corresponding copy of the metadata item, the position usable to identify the locations of the corresponding copy of the metadata item;
generating a first second-level index for the metadata index to index a first set of the first-level index, the first set of the first-level index all being associated with copies of the metadata item having locations of the first electronic device;
inserting a second indication into the first second-level index that directly specifies a first set of positions associated with the copies of the metadata item having the locations of the first electronic device;
generating a second second-level index for the metadata index to index a second set of first-level index, the second set of first-level index all being associated with copies of the metadata item having locations of the second electronic device;
inserting a third indication into the second second-level index that directly specifies a second set of positions associated with the copies of the metadata item having the locations of the second electronic device;
identifying an inconsistency between the metadata index and a remote metadata index from the second electronic device, the inconsistency being based on the second second-level index of the metadata index being different from a corresponding second second-level index of the remote metadata index, wherein the metadata index and the remote metadata index are generated using a same process; and updating the metadata index based on the identified inconsistency to obtain an updated metadata index that is consistent with the remote metadata index.

7. A computer program product being tangibly stored on a non-transitory computer-readable medium and comprising computer-executable instructions, the computer-executable instructions usable to create a metadata index for metadata of a multi-node system in which operation of the multi-node system depends on a consistency of the metadata across the multi-node system, the computer-executable instructions when executed, causing a computer to perform operations, the operations comprising:

identifying all locations of copies of a metadata item within the multi-node system, one of the locations being on a first electronic device of the multi-node system and a second of the locations being on a second electronic device of the multi-node system;

generating a first-level index for each of the copies of the metadata index;

inserting an indication into each first-level index to indicate a position of a corresponding copy of the metadata item, the position usable to identify the locations of the corresponding copy of the metadata item;

generating a first second-level index for the metadata index to index a first set of the first-level index, the first set of the first-level index all being associated with copies of the metadata item having locations of the first electronic device;

inserting a second indication into the first second-level index that directly specifies a first set of positions associated with the copies of the metadata item having the locations of the first electronic device;

generating a second second-level index for the metadata index to index a second set of first-level index, the second set of first-level index all being associated with copies of the metadata item having locations of the second electronic device;

inserting a third indication into the second second-level index that directly specifies a second set of positions associated with the copies of the metadata item having the locations of the second electronic device;

identifying an inconsistency between the metadata index and a remote metadata index from the second electronic device, the inconsistency being based on the second second-level index of the metadata index being different from a corresponding second second-level index of the remote metadata index, wherein the metadata index and the remote metadata index are generated using a same process; and updating the metadata index based on the identified inconsistency to obtain an updated metadata index that is consistent with the remote metadata index.

8. The electronic device of claim 6, wherein generating the first-level index comprises:

performing a hash algorithm on one of the copies of the metadata item, to generate a first character string associated with the one of the copies of the metadata item as the first-level index.

9. The electronic device of claim 6, wherein generating the first second-level index comprises:

performing a hash algorithm on the first set of the first-level indexes, to generate a second character string associated with the first set of the first-level indexes as the first second-level index.

10. The computer program product of claim 7, wherein generating the first-level index comprises:

performing a hash algorithm on one of the copies of the metadata item, to generate a first character string associated with the one of the copies of the metadata item as the first-level index.

11. The computer program product of claim 7, wherein generating the first second-level index comprises:

performing a hash algorithm on the first set of the first-level indexes, to generate a second character string associated with the first set of the first-level indexes as the first second-level index.

12. The method of claim 1, wherein the corresponding second second-level index of the remote metadata index contains a third indication that directly specifies a third set of positions associated with the copies of the metadata item having the locations of the second electronic device.

13. The electronic device of claim 6, wherein the corresponding second second-level index of the remote metadata index contains a third indication that directly specifies a third set of positions associated with the copies of the metadata item having the locations of the second electronic device.

14. The computer program product of claim 7, wherein the corresponding second second-level index of the remote metadata index contains a third indication that directly specifies a third set of positions associated with the copies of the metadata item having the locations of the second electronic device.

15. The method of claim 4, wherein the corresponding second-level index contains a third indication that directly specifies a position associated with the metadata item that is originally stored in the second electronic device.

* * * * *